United States Patent [19]
Stanford et al.

[11] Patent Number: 5,615,296
[45] Date of Patent: Mar. 25, 1997

[54] CONTINUOUS SPEECH RECOGNITION AND VOICE RESPONSE SYSTEM AND METHOD TO ENABLE CONVERSATIONAL DIALOGUES WITH MICROPROCESSORS

[75] Inventors: Vincent M. Stanford, Gaithersburg; Ora J. Williamson, Silver Spring, both of Md.; Elton B. Sherwin, Jr., Stanford, Conn.; Frank V. Castellucci, Purdys, N.Y.

[73] Assignee: International Business Machines Corporation, Armonk, N.Y.

[21] Appl. No.: 152,654

[22] Filed: Nov. 12, 1993

[51] Int. Cl.$^6$ .............................. G10L 3/02; G10L 9/00; G10L 3/00

[52] U.S. Cl. .............. 395/2.1; 395/2.8; 395/2.81; 395/2.31

[58] Field of Search ............... 395/2.1, 2.8, 2.81, 395/2.84

[56] References Cited

U.S. PATENT DOCUMENTS

| | | | |
|---|---|---|---|
| 4,069,393 | 1/1978 | Martin et al. | 381/43 |
| 4,087,630 | 5/1978 | Browning et al. | 395/2.45 |
| 4,144,582 | 3/1979 | Hyatt | 395/2.12 |
| 4,461,024 | 7/1984 | Rengger et al. | 395/2.42 |
| 4,481,593 | 11/1984 | Bahler | 395/2.62 |
| 4,489,435 | 12/1984 | Moshier | 381/43 |
| 4,718,088 | 1/1988 | Baker et al. | 381/43 |
| 4,720,802 | 1/1988 | Damoulakis et al. | 395/2.42 |
| 4,783,803 | 11/1988 | Baker et al. | 381/42 |
| 4,805,218 | 2/1989 | Bamberg et al. | 381/43 |
| 4,829,572 | 5/1989 | Kong | 381/41 |
| 4,856,066 | 8/1989 | Lemelson | 381/36 |
| 4,897,878 | 1/1990 | Boll et al. | 395/2.42 |
| 4,905,286 | 2/1990 | Sedgwick et al. | 395/2.42 |
| 4,922,538 | 5/1990 | Tchorzewski | 381/42 |
| 4,933,973 | 6/1990 | Porter | 381/43 |
| 5,006,987 | 4/1991 | Harless | 364/419 |
| 5,027,406 | 6/1991 | Roberts et al. | 395/2 |
| 5,036,538 | 7/1991 | Oken et al. | 395/2.42 |
| 5,054,082 | 10/1991 | Smith et al. | 381/42 |
| 5,357,596 | 10/1994 | Takebayashi et al. | 395/2.84 |

FOREIGN PATENT DOCUMENTS 215573 8/1985 European Pat. Off. .

OTHER PUBLICATIONS

Lee, K.F., "Context Dependent Phonetic HMM for Speaker-Independent Continuous Speech Recognition," Apr., 1990, IEEE Transactions on Acoustics, Speech and Signal Processing, pp. 599–609.

IEEE Article by K. F. Lee & H. W. Hon, "Large Vocabulary Speaker Independent Continuous Speech Recognition Using HMM," 1988, pp. 123–126, (CH2561–9/88/00000–0123).

*Primary Examiner*—Ayaz R. Sheikh
*Assistant Examiner*—Indranil Chowdhury
*Attorney, Agent, or Firm*—John E. Hoel; Joseph C. Redmond, Jr.; Richard A. Tomlin

[57] ABSTRACT

A continuous speech recognition and voice response system provides a natural sounding and effective interactive, speech-driven dialogue from a data processing system. A concatenation of words into phrases and sentences improves recognition and mimic natural language processing. The system uses speaker-independent, continuous-speech to initiate the playback of audio files. The system employs high-speed context switching to modify the active vocabulary and applies high-speed context switching to modify or activate Audio WAV voice response files. The system uses dialogue history to activate selected context, Baukus-Naur Form (BNF) grammars and WAV files and provides phrase or sentence long dialogue prompts to improve accuracy. The system also provides audio prompts to improve accuracy and provides speech-activated buttons to navigate between menus.

40 Claims, 5 Drawing Sheets

500

| 502 | BEGIN METHOD TO PLAYBACK CONTEXT RELATED VOICE RESPONSE SIGNALS AND DISPLAY CONTEXT RELATED DISPLAY PROMPTS |
| --- | --- |
| 504 | STORING IN A FIRST PARTITION OF A MEMORY, A FIRST PLURALITY OF WORDS HAVING A FIRST CONTEXT, EACH OF THE FIRST PLURALITY OF WORDS INCLUDING A SECOND PLURALITY OF PHONEMES |
| 506 | STORING IN THE FIRST PARTITION A THIRD PLURALITY OF VOICE RESPONSE WORDS HAVING THE FIRST CONTEXT |
| 508 | STORING IN THE FIRST PARTITION A FOURTH PLURALITY OF DISPLAY PROMPTS HAVING THE FIRST CONTEXT |
| 510 | STORING IN A SECOND PARTITION OF THE MEMORY, A FIFTH PLURALITY OF WORDS HAVING A SECOND CONTEXT, EACH OF THE FIFTH PLURALITY OF WORDS INCLUDING A SIXTH PLURALITY OF PHONEMES |
| 512 | STORING IN THE SECOND PARTITION A SEVENTH PLURALITY OF VOICE RESPONSE WORDS HAVING THE SECOND CONTEXT |
| 514 | STORING IN THE SECOND PARTITION AN EIGHTH PLURALITY OF DISPLAY PROMPTS HAVING THE FIRST CONTEXT |
| 516 | STORING IN A THIRD PARTITION OF THE MEMORY, A NINTH PLURALITY OF PHONEME PATTERN MATCHING DATA UNITS |
| 518 | STORING A FIRST POINTER MAP IN THE MEMORY INCLUDING A SECOND PLURALITY OF POINTERS, EACH OF WHICH RELATES TO A RESPECTIVE ONE OF THE SECOND PLURALITY OF PHONEMES TO A RESPECTIVE ONE OF THE NINTH PLURALITY OF PATTERN MATCHING DATA UNITS |
| 520 | STORING A SECOND POINTER MAP IN THE MEMORY INCLUDING A SECOND PLURALITY OF POINTERS, EACH OF WHICH RELATES TO A RESPECTIVE ONE OF THE SIXTH PLURALITY OF PHONEMES TO A RESPECTIVE ONE OF THE NINTH PLURALITY OF PATTERN MATCHING DATA UNITS |
| 522 | SELECTING THE FIRST CONTEXT PARTITION AND THE FIRST POINTER MAP IN RESPONSE TO A FIRST INPUT |

FIG. 4A

CONTINUOUS SPEECH RECOGNITION AND VOICE RESPONSE SYSTEM AND METHOD TO ENABLE CONVERSATIONAL DIALOGUES WITH MICROPROCESSORS

BACKGROUND OF THE INVENTION

1. Technical Field

This invention relates to a speech recognition and voice response system capable of dealing with a plurality of speech recognition contexts in an efficient manner.

2. Background Art

This patent application is related to U.S. patent application Ser. No. 07/947,634 entitled "Instantaneous Context Switching for Speech Recognition Systems," by V. M. Stanford, et al., assigned to the IBM Corporation and incorporated herein by reference.

This patent application is also related to U.S. patent application Ser. No. 07/968,097 entitled "Method for Word Spotting in Continuous Speech," by J. H. Garman, et al., (now U.S. Pat. No. 5,513,298 issued Apr. 30, 1996) assigned to the IBM Corporation and incorporated herein by reference.

Speech recognition systems are well-known to pending the art. Examples include the IBM Tangora [10] and Dragon Systems Dragon 30k dictation systems. Typically, they are single user, and speaker-dependent. This requires each speaker to train the speech recognizer with his or her voice patterns, during a process called "enrollment." The systems then maintain a profile for each speaker, who must identify themselves to the system in future recognition sessions. Typically speakers enroll via a local microphone in a low noise environment, speaking to the single machine on which the recognizer is resident. During the course of enrollment, the speaker will be required to read a lengthy set of transcripts, so that the system can adjust itself to the peculiarities of each particular speaker.

Discrete dictation systems, such as the two mentioned above, require speakers to form each word in a halting and unnatural manner, pausing, between, each, word. This allows the speech recognizer to identify the voice pattern associated each individual word by using preceding, and following, silences to bound the words. The speech recognizer will typically have a single application for which it is trained, operating on the single machine, such as Office Correspondence in the case of the IBM Tangora System.

Multi-user environments with speaker dependent speech recognizers require each speaker to undertake tedious training of the recognizer for it to understand his or her voice patterns. While it has been suggested that the templates which store the voice patterns may be located in a common data base wherein the system knows which template to use for a speech recognition by the speaker telephone extension, each speaker must none-the-less train the system before use. A user new to the system calling from an outside telephone line will find this procedure to be unacceptable. Also, the successful telephonic speech recognizer will be capable of rapid context switches to allow speech related to various subject areas to be accurately recognized. For example, a system trained for general Office Correspondence will perform poorly when presented with strings of digits.

The Sphinx system, first described in the Ph.D. Dissertation of Kai-Fu Lee, represented a major advance over previous speaker-dependent recognition systems in that it was both speaker independent, and capable of recognizing words from a continuous stream of conversational speech. This system required no individualized speaker enrollment prior to effective use. Some speaker dependent systems require speakers to be re-enrolled every four to six weeks, and require users to carry a personalized plug-in cartridge to be understood by the system. Also with continuous speech recognition, no pauses between words are required, thus the Sphinx system represents a much more user friendly approach to the casual user of a speech recognition system. This will be an essential feature of telephonic speech recognition systems, since the users will have no training in how to adjust their speech for the benefit of the recognizer.

A speech recognition system must also offer real time operation with a given modest vocabulary. However, the Sphinx System still had some of the disadvantages of the prior speaker dependent recognizers in that it was programmed to operate on a single machine in a low noise environment using a microphone and a relatively constrained vocabulary. It was not designed for multi-user support, at least with respect to the different locations, and multiple vocabularies for recognition.

The above cited V. M. Stanford, et al. patent application overcomes many of the disadvantages of the prior art. The speech recognition system is divided into a number of modules including a front end which converts the analog or digital speech data into a set of Cepstrum coefficients and vertical quantization values which represent the speech. A back end uses the vector quantization values and recognizes the words according to phoneme models and word pair grammars as well as the context in which the speech made. By dividing the vocabulary into a series of contexts, situations in which certain words are anticipated by the system, a much larger vocabulary can be accommodated with minimum memory. As the user progresses through the speech recognition task, contexts are rapidly switched from a common data base. The system also includes an interface between a plurality of user applications also in the computer network.

The system includes training modules, training and task build modules to train the system and to build the word pair grammars for the context respectively.

The ideal man-machine or microprocessor interface allows the user to talk naturally back and forth with the machine. This natural dialogue is important for virtually all microprocessor-based applications. Interactive, speech-driven dialogue is key to making many applications human centric. For example:

Help systems for computers, operating systems and consumer goods.

Interactive educational multimedia programs.

Executive information systems.

Portable speech-driven electronic mail and voice mail systems.

Interactive translation software.

Speech-driven kiosks.

A natural interactive, speech-driven, user interface has a number of technical problems:

Frequently users slur their words or imbed unnecessary "ums, ahs, and pauses" in their speech.

Users frequently forget what words, phrases and questions the computer understands and thus create phrases like, "What is the latest news, or was I um, ah, supposed to say what is the latest research, or is it the most recent research on IBM..."

Users sometimes ignore prompts.

Users forget predefined command vocabularies.

Users resist training systems. The ideal solution must be "walk-up-and use."

Text-to-speech subsystems continue to sound unnatural. Computers reading ASCII or EBCIDIC text files continue to sound inebriated, and are frequently unintelligible by non-native speakers.

Users resist speaking slowly or in an isolated word mode.

OBJECTS OF THE INVENTION

It is therefore an object of the present invention to provide a continuous speech speaker independent speech recognizer and voice response for a plurality of users.

It is another object of the invention to provide a speech recognizer and voice response having a large vocabulary of words with a minimum memory requirement.

It is another object of the invention to enable a plurality of voice applications to be recognized by the speech recognizer concurrently and generate corresponding voice responses in the computer network or telephonically.

SUMMARY OF THE INVENTION

These and other objects are accomplished by the continuous speech recognition and voice response system. It provides a natural sounding and effective interactive, speech-driven dialogue from a data processing system. The invention provides the concatenation of words into phrases and sentences to improve recognition and mimic natural language processing. The invention uses speaker-independent, continuous-speech to initiate the playback of audio files. The invention employs high-speed context switching to modify the active vocabulary. The invention applies high-speed context switching to modify or activate WAV voice response files. The invention uses dialogue history to activate selected context, BNF grammars and WAV files. The invention provides phrase or sentence long dialogue prompts to improve accuracy. The invention also provides audio prompts to improve accuracy. And the invention provides speech-activated buttons to navigate between menus.

DESCRIPTION OF THE DRAWINGS

These and other objects, features and advantages will be more fully appreciated with reference to the accompanying figures.

FIGS. 4A and 4B show a flow diagram of the invention.

DISCUSSION OF THE PREFERRED EMBODIMENT

Figure 1:
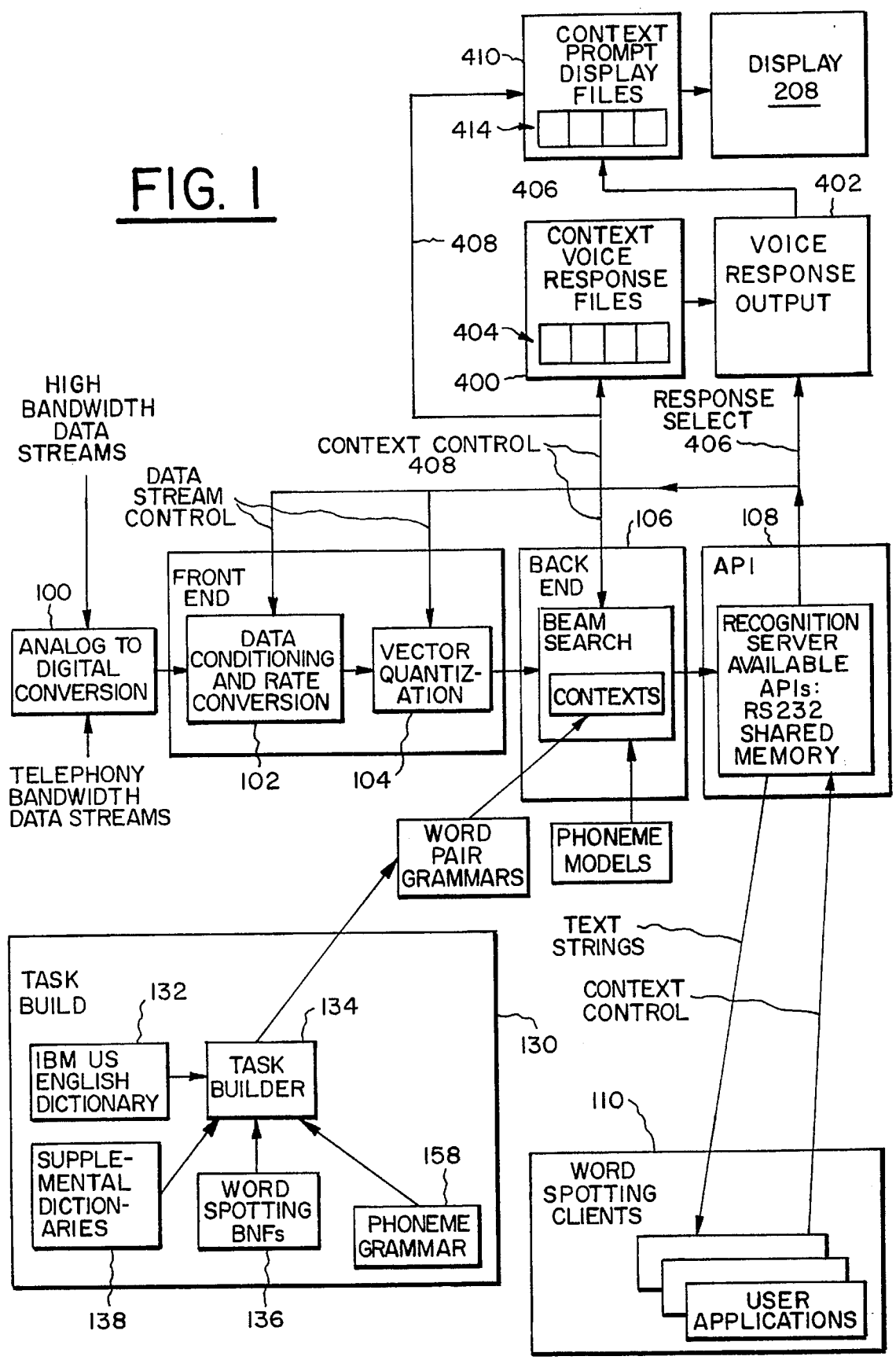
FIG. 1 illustrates the logical architecture of a continuous speech recognition and voice response system.

The Concatenation of Words, Baseforms and Phonological Data into Phrases and Sentences to improve Recognition and Mimic Natural Language Processing To simplify the coding and improve the recognition in the original version of the Spanish Translator, the invention concatenates (hyphenates) words together into phrases. This significantly simplifies program logic and dramatically improves recognition.

In sentences or questions with four or fewer words, it concatenates the entire sentence into one isolated utterance. In sentences with five or more words, it concatenates the first half of the sentence into one phrase and the second half of the sentence into a second phrase. This enables a logic check to ensure that the first half of the sentence matches the appropriate second half. If the phrase level bi-grams do not match, there is a speech-recognition error. Thus, this technique of speaker-independent, continuous-speech phrases and bi-grams has three very positive impacts:

The increased recognition rate.

It simplifies programming by eliminating the need for word spotting and natural language programming (NLP) logic.

It provides an easy way to eliminate random misrecognition.

Additionally, this method of stringing or concatenating speaker-independent baseforms (phonemes or phonological data) into long phrase level utterances, causes the system to mimic natural language processing algorithms. Indeed, it appears to be more effective than many NLP algorithms.

By doing a best-fit acoustical analysis at a phrase level, the user's question or phrase almost always snaps to the appropriate question, even when the user garbles his question, when there is background noise, or when he phrases the question differently from the finite state grammar.

This simple-to-implement technique of restricting speaker-independent, continuous-speech systems to mimic isolated utterance systems by concatenating the baseforms opens up a whole realm of walk-up-and use applications. This technique out performs much more complex word spotting and NLP algorithms.

The Use of Speaker Independent, Continuous-Speech to Initiate the Playback of Audio (WAV) Files The user says a command or phrase and the computer comes back with a sound byte or answering phrase. For example:

In the Spanish Translator, the user says, "Where is the police station?" and the response is, "Donde esta la estacion de policia?"

The Spanish Translator is an example of using multiple competing finite state grammars in a speaker-independent, continuous-speech system for the purpose of launching audio files.

In the police car application, the user says, "Check license plate alpha bravo Charlie 1-2-3." The computer responds, "No wants, no warrants."

This is an example of: using a single BNF grammar with imbedded variables for the purpose of doing a data base retrieval or table lookup which in turn determines which of one or more WAV files should be played back.

In this application, multiple WAV files are combined and/or combined with a text-to-speech subsystem. The system responds with two WAV files back to back, for example, "No wants, no warrants," and "Registration has expired."

The invention also constructs multiple competing BNF grammars with imbedded variables that launch one or more WAV files. The stockbroker application uses four competing BNFs.

BUY<1NUM><2NUM>SHARES OF<COMPANY-NAME>SELL<1NUM><2NUM>SHARES OF<COMPANY-NAME>DISPLAY RESEARCH ON<COMPANY-NAME>RETURN-TO-MAIN-MENU or RETURN-TO-THE MAIN-MENU

This application selectively launches one or more WAV files based on various conditions.

This invention is implemented on personal computers with speakers and microphones. The invention supports multiple competing strings. This disclosure supports multiple BNF's with imbedded variables.

The Use of Dialogue Prompts to Launch WAV Files, and the Use of Phrase or Sentence Long Prompts to Improve Accuracy Two factors limited the ability of researchers and developers to produce computer interfaces capable of "HAL-like" interfaces that allow users to dialogue with computers. These two major inhibitors were:

The lack of continuous-speech, speaker-independent, speech recognition subsystem. If the subsystem cannot recognize continuous speech, it is incapable of dialoguing naturally with a human being.

The assumption on the part of the research and development community that dialogue managers would need to be capable of word spotting and complex natural language processing (NLP).

The first design constraint was removed with the advent of the IBM Continuous Speech Series described in the above referenced V. M. Stanford, et al. patent application. The second design constraint was false. Natural speech-driven dialogue managers can be built in accordance with the invention, without sophisticated natural language processing engines.

The key to creating natural dialogue-like engines or interfaces is to display those questions, sentences and phrases that the user is most likely to say at any given point in the application, on-screen. Users then scan the list, find the phrase, sentence, or question that is closest to what they are interested in, and then, read the prompt.

Recognition accuracy can jump from the 40–70 percent level to the 90–99.5 recognition levels. Furthermore, users move through their task more quickly as the prompts help them focus on the question or problem at hand. Thus, each prompt is associated with one or more grammars and each grammar and optionally, the key imbedded variables in the grammar are associated with a specific WAV file or sequence of WAV files. For example, the on-screen prompt might read: "How do I remove ketchup stains?"

The finite state grammar associated with this sentence might be identical to the query and might optionally include one or more aliases such as "ketchup stains" or "removing ketchup stains." The usefulness of including aliases can be determined in field trials. Usually it improves accuracy but sometimes it lowers accuracy.

Each grammar is then associated with one or more WAV files in sequence. In this example, the alias grammars would be associated with the same WAV file. Thus, the user would say, "How do I remove ketchup stains?" The speech-recognition subsystem would return this string to the application, and the application would reply with a recorded sound byte.

It is noteworthy that the user does not have to ask the question precisely. The finite state grammar and hidden Markov modeling technique naturally snap to the closest phrase in the active grammar. Error parameters can be set so that true outliers (such as "Darn, the phone's ringing") are recognized as errors. However, sentences such as, "I'm having problems with ketchup stains," will be "misrecognized" by the speech-recognition subsystem as "How do I remove ketchup stains?" Thus, the combination of finite state grammars, hidden Markov models, WAV files and optionally, on-screen prompts, effectively mimics a natural language subsystem. Indeed, there is some evidence that the combination of finite state grammars and hidden Markov models are more effective than sophisticated AI systems capable of word spotting or NLP-like function.

Combining Audio and Visual Prompts to Improve Accuracy

Previously, much of the leading-edge, speech-recognition research focused on increasing the vocabulary size and accuracy of the systems. The objective was to let the user say whatever he wanted. The invention restricts what the user can say and to encourage him to say it in a formal (grammar) that the computer will likely understand. We have found that short audio prompts significantly improves our ability to do this. For example, the computer will say, "What topic do you wish to discuss?" The screen prompts: "Say one of the following." And the computer then displays the list of topics available and the scenario precedes as outlined in the prior section.

Critical to note here is that simply saying "What topic do you wish to discuss?" through a speaker or ear piece on a telephone handset, dramatically improves the likelihood that the user will follow the instructions on-screen. Note also, that the audio prompt is usually slightly different than the on-screen prompt "What topic would you like to discuss?" and "Please say one of the following." Thus, an audio prompt (WAV file) is combined with on-screen visual prompts that match one or more grammars that are then associated with selected WAV files.

The Use of High Speed Context Switching to Modify the Active Vocabulary

Support for high speed context switching is a standard feature of the IBM Continuous Speech Series, as described in the V. M. Stanford, et al. patent application cited above. The context can be defined as a set of words, phrases, questions, sentences, or n-grams that are simultaneously active. A context is defined by an event. Typically, this is the last thing that the user said. However, it can also be an external interrupt, such as a user picking up a telephone handset, clicking a mouse, or pressing a key, or a system or program generated input, such as a time out due to inactivity. For example, in a computer assisted advice program on video tape rentals, it will ask, "What kind of video tape would you like to rent tonight?" The kiosk or TV screen will display western, comedy, action adventure, mystery, etc. The user might answer, "Action adventure." The computer then will say, "Would you like recommendations on recent releases or our all-time favorite?" The computer then activates a new context, different than the prior one. The prior one contained movie types. The new context contains, in this instance, at least two phrases, "recent releases" and "all-time hits." Note that this second context can be different, depending upon what the answer to the first question had been. Let's assume that the user says, "recent releases." The computer then asks, "Which of the following movies are you interested in?" and then displays multiple choices on-screen. Again, the computer has now activated a new context. Note that there are now dozens or hundreds of different contexts possible at this level of the program, virtually every combination of the prior two answers will now generate a new context.

The Use of High-Speed Context Switching to Modify or Activate WAV Files

In addition to the speech-recognition vocabulary or active context being modified based on user responses and other interrupts, the audio out or WAV file can also be defined by the user's prior answers. To continue the prior example, let's assume that user were to say, "Star Wars." The VCR rental program then takes the results from the speech-recognition program and uses that to access and play back a specific WAV or audio file (and perhaps text or multimedia as well) in response to the user's request to receive more information on the science fiction, action adventure, classic, or Star Wars.

The Use of Dialogue History to Select Active Contexts, BNF Grammars, and WAV Files In many applications, the prior three features of the invention are combined so that the answer to any previous question or the entire history of the interaction may influence or define what the currently active context and WAV files are. In the movie example, the answer to, "What kind of movie are you interested in?" and "Are you interested in a new release?" define what context and WAV files are presented to the user. Additionally, other external information, such as what video tapes the user has rented in the past, or information from prior speech-recognition interactions, are accessed and processed to better define what context and WAV files are active. For example, the user may have been asked in a prior session whether he was interested in R-rated movies, and this is used to further define the context.

The Use of Speech Activated Buttons to Navigate Between Menus and Contexts

Users frequently have problems navigating back up menu trees. Users can not remember the predefined phrase to get back to the main menu, such as "return to the prior menu, or repeat the demo, or return to main menu." Three techniques are used in combination that resolved this in the invention:

Buttons are displayed on the lower right-hand corner, for each of the likely screens or contexts that a user may wish to jump to:
Return-to-main-menu
Repeat-the-demo
Select-another-XXXX
Return-to-OS/2

The words in the button are concatenated into a single fixed utterance and when appropriate, hidden aliases are provided, for example, return-to-main-menu has the following aliases:
Main-menu
Return-to-the-main-menu The invention provides speech-enabled buttons in this manner to navigate or jump between critical screens and uses speaker-independent, continuous baseforms which are concatenated together.

The features of this invention provide the key that unlocks many interactive dialogue applications. These applications would include:
Interactive cable TV boxes
Kiosks
Interactive video games
Speech-driven interactive optical discs
Interactive help facilities FIG. 1. illustrates the logical architecture of the IBM Continuous Speech Recognition System (ICSRS) with the context voice response feature, independent of hardware configurations. At a broad level, the system consists of components addressing the following areas:

Data Acquisition—Data are converted from analog to digital form, or potentially demultiplexed from other channels in the case of telephonic data.

Data Compression—The ICSRS Front End conditions, resamples, and compresses speech data streams to 300 bytes per second during the vector quantization step.

Speech Recognition—The Back End performs the actual speech recognition by pattern matching phoneme models using a grammar-guided beam search algorithm. The phoneme models and word pair grammars together constitute the recognition contexts. Single or multiple instances of Back-End recognizers can be deployed either remotely or locally to the Front-End instances which acquire and compress the speech data.

Task Building—The task building component allows the construction of recognition contexts off-line, compiles the word pair grammars for use at run time, and binds appropriate phoneme models to the task (context).

Context Voice Response—Digital voice files are stored for each respective recognition context. The files are accessed in response to the selection of a corresponding recognition context.

Context Prompt Display—Prompt display files are stored for each respective recognition context. The files are accessed in response to the selection of a corresponding recognition context.

Application Program Interface—The API offers RPC based recognition services which allow data stream control, context loading, and activation.

Either a high bandwidth voice data stream from a local microphone or a low bandwidth voice data stream, such as would be associated with telephony, is received by the Analog to Digital Conversion block 100. The Analog to Digital Conversion 100 can be performed by a hardware card such as the IBM M-Audio Capture and Playback Card (M-ACPA) card in the voice workstation. It has a digital signal processor which processes either the high bandwidth or telephony bandwidth signals and converts them to a series of digitally sampled data points. This conversion could also be performed by a digital PBX, and the telephony data streams provided in 8 KHz, 8-bit mu-law/a-law compressed format. For purposes of the present invention, high bandwidth is defined as being a sampling rate of 16 kilohertz or above. Low bandwidth is defined as 8 kilohertz or below which is what the general telephone system in the United States uses for digital voice. The A/D conversion block 100 is optional as in a telephone system the digital information could come in from a private phone exchange (PBX).

The first major block in the "front end" is the Data Conditioning and Rate Conversion (DCRC) block 102. The digitalized input from the A/D conversion 100 is at 44 or 8 kilohertz. A resampling technique is used as provided by the public literature in the IEEE [2]. The DCRC 102 samples and uses anti-aliasing filters on the digitized signal to create either a 16 kilohertz or 8 kilohertz data stream, for subsequent use. Both the DCRC and Vector Quantization processes are described in greater detail below and in the copending U.S. patent application Ser. No. 07/948,031, filed Sep. 21, 1992 by N. F. Brickman, et al., entitled "Telephony Channel Simulator for Speech Recognition Application," assigned to IBM Corporation and incorporated herein by reference.

After data conditioning and rate conversion, the voice data is passed to the Vector Quantization block 104. In Vector Quantization, the digital data stream is segmented into Frames of one-fiftieth of a second duration, resulting in 320, 220, and 160 samples each at 16 KHz, 11 KHz, and 8 KHz sampling rates respectively. In one preferred embodiment, there are a hundred frames per second computed from any bandwidth speech signal, they are then over-lapped by fifty-percent, and have a Hamming window applied. The Hamming window is well defined in the public literature [3]. After the voice data stream is broken into frames, the vector quantization step extracts features from each frame. In the extraction portion of the vector quantization step, a series of parameters called the LPC Cepstrum Coefficients are calculated. The Cepstrum Coefficients extract and summarize some of the important characteristics of the speech for pattern recognition. In each frame of data, a fiftieth of a second of speech is encapsulated. One would expect to have fifty frames per second, however, there is fifty-percent overlap so a hundred frames per second are generated. To calculate the Cepstrum Coefficients, first a Hamming window, which is a cosine bell, is applied to the voice data. A Hamming window tapers the edges each frame of voice data to make the data extracted behave more like they would in an infinite duration continuous Fourier Transform.

The Hamming windowed frames are pre-filtered using a filter whose z-transform is $1.0-0.97'z-1$, [1] page 49, in order to flatten the speech spectrum. Then 14 auto-correlation coefficients are computed. The auto-correlation coefficients are used to compute the Cepstrum coefficients in a manner well-known in the public literature, described in [4]. Thirteen Cepstral coefficients are derived from the 14 auto-correlation coefficients. Other numbers of auto-correlation coefficients and dimensions of numbers of Cepstrum coefficients are possible. The statistical properties of these coefficients are used to guide the final vector quantization step.

Vector quantization is also used in the training process. The adjustment of the training data described below are crucial in enabling the base Sphinx recognition engine to operate over telephony equipment, and hence to the invention described herein. In the training process, a number of sentences are taken, currently between ten to fifteen thousand, and segmented into frames, from which auto-correlation and Cepstrum coefficients are calculated. A clustering procedure is applied to segregate the Cepstrum frame features into two hundred and fifty six classes using a k-means type clustering procedure, described in [5]. The centers of these Cepstrum clusters, and their class labels, taken together, are hereafter referred to as "code books."

For the final step of vector quantization, block 104 refers to a code book derived in the training procedure, just described, to determine which cluster center is closest to the frame Cepstral coefficients. The current frame is then assigned to the class represented by that code book value. Since there are 256 classes, the VQ value is represented by one byte. There are two other one-byte VQ values derived, from the differential Cepstrum, and the power in the frame. There are three one-byte VQ values derived one hundred times per seconds, resulting in a compression of the speech data stream to 2,400 bits per second.

The beam search (block 106) matches time series derived in the vector quantization, to word sequences from within the word pair grammars, defining each context. The Recognition Server communicates with user applications or Recognition Clients (block 110). The invention's architecture can have multiple front end (workstations) communicating to a single back end or multiple front ends communicating to multiple back ends.

The system is organized and implemented for different levels of operation. For communication networks with a very high data rate, the speech samples could be communicated directly to the system executing the back-end, for front end data compression. A plurality of raw digital speech data streams could be sent to the server containing the back end for multiple users. For a telephony system, multiple channels go to one back end, or multiple users come in to the front end and back end together.

The system is primarily organized around the speech recognition functions deployed as speech recognition servers. The system is guided by any one of a plurality of word pair grammars the application has chosen as the current context. The application has interfaces to the speech recognition system with Application Program Interface (API) calls supporting functions like initializing procedures, status codes and commands [6]. The application will request a certain type of operation or ask the recognition server to load a certain recognition context and to activate the context for recognition when required. The tasks are pre-loaded by the server, usually when the application is first executed. They are then sequentially activated, as required by the activity of the application program.

A set of API calls in the recognition server (block 108) allows user applications (block 110) to request the services of the speech recognition system. User application programs (block 110) can be running on the same computer or a different computer as the various components of the recognition server. If it is on the same computer, the application program (block 110) might interface with the recognition server through shared memory and semaphores, supported by the operating system. If the application program (block 110) and recognition server are on a different computers, communication can be arranged via an RS232 interface, or Remote Procedure Calls (RPC). RPC being well-known in the programming literature [7].

Typical examples of user applications may include: Executive Information Systems, Data Base Access via verbal query, software problem reporting systems, and so forth.

Another example is a telephone answering voice response unit (VRU) which could call on the recognition server to take advantage of the its services. We have implemented versions of these servers on the RISC System 6000(TM) and PS/2(TM) with OS/2(TM).

The Direct Talk 6000(TM) is a similar telephony VRU system. In Direct Talk 6000(TM) rather than dealing with single telephone lines, the VRU system could require processing of a T1 line (with 24 conversation channels, possibly active simultaneously).

The recognition server architecture can handle multiple clients, as would be required to process such high-volume telephony applications as DirectTalk(TM).

The user applications can pre-register many contexts: a restaurants locator, a hard disk help desk, or a software help desk can all pre-register multiple contexts hierarchically. With each application, several users can be inputting speech streams. Each application will tell the recognition server to perform a recognition under a particular context for a particular speech stream, as appropriate for the task being executed.

In other words, multiple users dealing with the same API interface will register all their tasks, with one, or possibly several versions of the recognition server. The system arranges to avoid redundantly loading recognition tasks for multiple users, by checking if the requested task has already been loaded.

The task building (block 130) has several basic sources for its input. One is a U.S. English dictionary (block 132), which is a base dictionary with the pronunciations of twenty thousand words in it. The supplemental dictionary (block 138) is application specific, and allows for the addition of the pronunciation of words not found in the base dictionary. This would typically consist of proper nouns, acronyms, and the like, which a particular application requires for recognition.

The base U.S. dictionary (block 132) supplies words and the phoneme strings drawn on by the Task Builder (block 134). The Task Builder also draws on an appropriate task Baukus-Naur Form (BNF) grammar to determine what can be recognized by the speech server under the task, from the Task BNF library (block 136). For example, in an application which provides information on area restaurants, a first context may be the type of restaurant the caller wants, e.g., French, Italian, Chinese and a second context once the type was established would be the restaurants in that particular category. The task builder analyzes the BNF to find all the words that are required for the pattern matching and draws out the phoneme representation from the general U.S. dictionary (block 132). Inevitably, every particular application has its own sub-vocabulary which must be added to the system and these are stored in the supplemental dictionaries. For example, in a restaurant help desk, there are generic English words, such as: "Italian," "French," "Spanish," etc., which would be found in the standard U.S. dictionary. However, restaurant names, particularly in foreign languages, e.g., "Cherchez LesFemmes," "Chateau Voulez," but also unusual names for an American restaurant, e.g., J. J. Muldoon's, will not be in any normal dictionary, and must be added to the task supplemental dictionary (block 138). These supplemental dictionaries (block 138) can also contain local vocabulary that is in the base General English (block 132) dictionary which override the pronunciations.

The task builder (block 134) analyzes the input BNF grammar, and generates a grammar which is a list of each word in the grammar and a sub-list of all the words that can follow. Thus each word in the grammar has a list attached to it of legal following words and a pointer to the phoneme representation of each word, (called phoneme models in FIG. 1). The phoneme models are Hidden Markov Models of observing the various VQ values. The hidden Markov models are a group of discrete probability distributions, for the VQ values (as in block 104). These provide the probability of the occurrence of VQ values, given that the hidden Markov state machine is in a particular state within a phoneme. The public literature contains excellent descriptions of Hidden Markov Models in [8], as well as elsewhere.

The Beam Search (block 106) uses word models made of concatenated HMM phoneme models from a large table of context sensitive triphones which are generated during the training process. These are used to make an optimal estimate of the word sequence which best explains the observed sequence of VQ values. The beam searcher (block 106) uses the word grammars to select the phoneme models from which to construct the word models used in the search.

The user applications control the recognition server. For example, DirectTalk/2(TM), an IBM Program Product described in [9], could be a user application; it is able to answer the phone and perform restaurant locator functions. The restaurant locator application would use the DirectTalk/2(TM) system to indicate to the recognition server that it has sixteen contexts and issue a request to pre-load the contexts which are part of the Restaurant Locator help desk. As the application progresses, it requests the context switching of the recognition server. A user calls via the telephone for telephone help. The restaurant locator then requests the recognition server to perform a voice recognition under the first level context. Control and data are exchanged over the API between the recognition server, and the user application. Multiple instances of the DirectTalk/2(TM) system could use the same recognition server.

The speech recognition server acquires speech data until a (user adjustable, but most commonly 0.6 seconds) period of silence. Recognition is terminated when this period is observed, and it is assumed that the person is done speaking.

The context voice response files 400 which include a plurality of files 404, are connected to the recognition server 108. When the recognition server designates a new context over the context control line, a new context voice response file 404 is accessed and provided to the voice response output 402. This is carried out in parallel with the invocation of a new recognition context in the beam search module 106. As the recognition server 108 receives corresponding text string messages from the beam search module 106, for a particular recognized speech string, the recognition server will output a corresponding response signal to the voice response output 402 over the response select 406. The response select 406 will identify which one of a plurality of stored digital voice responses are to be announced. The corresponding voice response string is accessed from the selected context voice response file 404 and played back by the voice response output.

Figure 3:
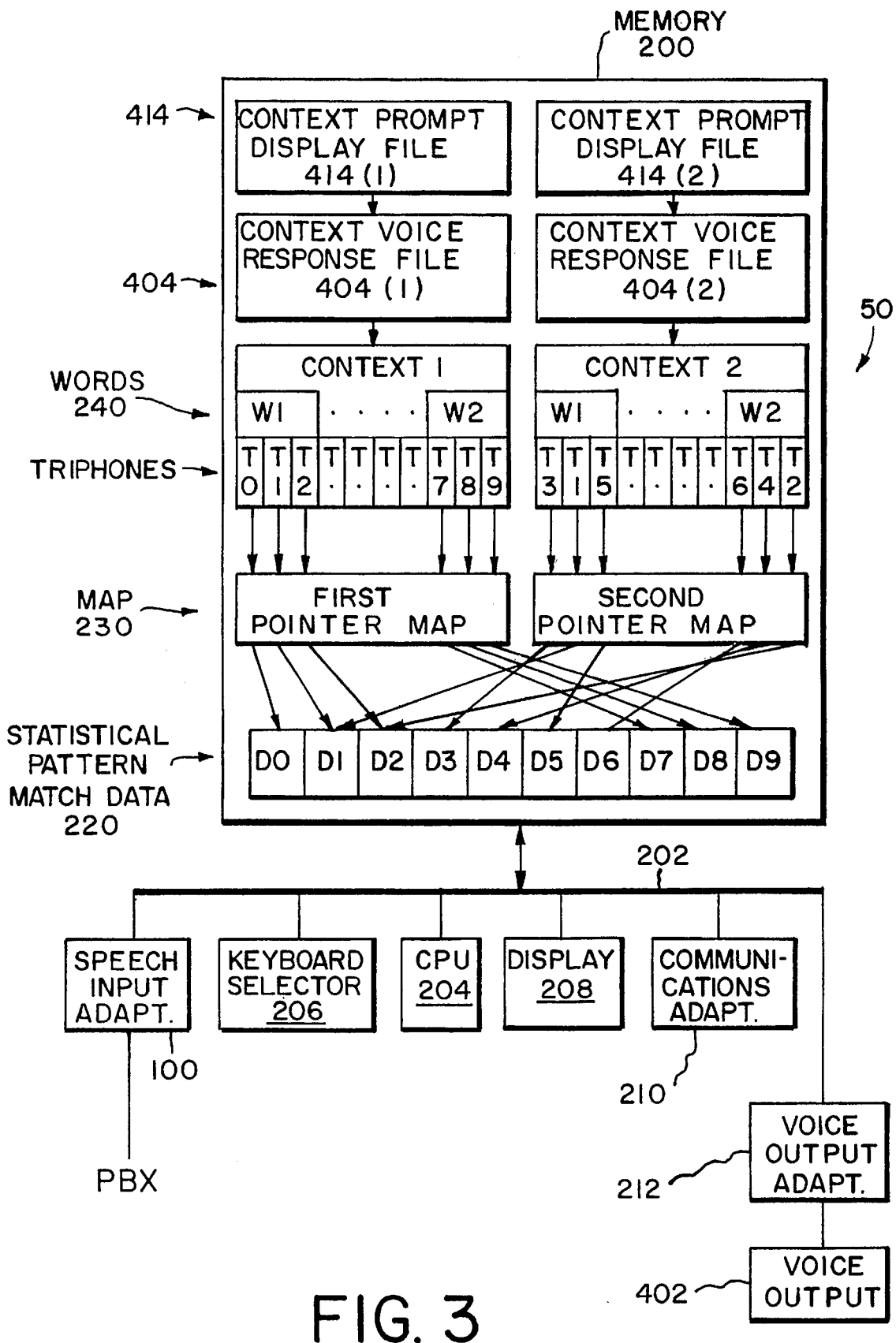
FIG. 3 is more detailed block diagram of the instantaneous context switching speech recognition system and voice response system, in accordance with the invention.

Reference to FIG. 3 will show that there are two context voice response files 404(1) and 404(2). The context voice response file 404(1) is selected in conjunction with the context 1 recognition context. The context voice response file 404(2) is selected in conjunction the context 2 voice recognition context.

FIG. 1 also shows the context prompt display files 410 which have an input 408 for context control output from the recognition server API 108. The context prompt display files 410 include a plurality of display files 414. The context control 408 will select one of the context prompt display files 414, in conjunction with the selection of a corresponding context voice response file 404 and a corresponding recognition context. The context prompt display file 414 which is selected, is output to the display 208. This typically will display a menu of visual prompts which the user can read and select from. The response select line 406 is input to the context prompt display file 410, to identify which one of a plurality of prompts are to be displayed from a particular selected display file which has been selected by the context control 408. There may be a plurality of menus, each menu including a plurality of prompting lines to be displayed, for each file 414. Referring to FIG. 3, the context prompt display file 414(1) is selected when the context voice response file 404(1) is selected and the recognition context 1 is selected. Similarly, the context prompt display 414(2) is selected when the context voice response file 404(2) is selected and the recognition context 2 is selected.

Figure 2:
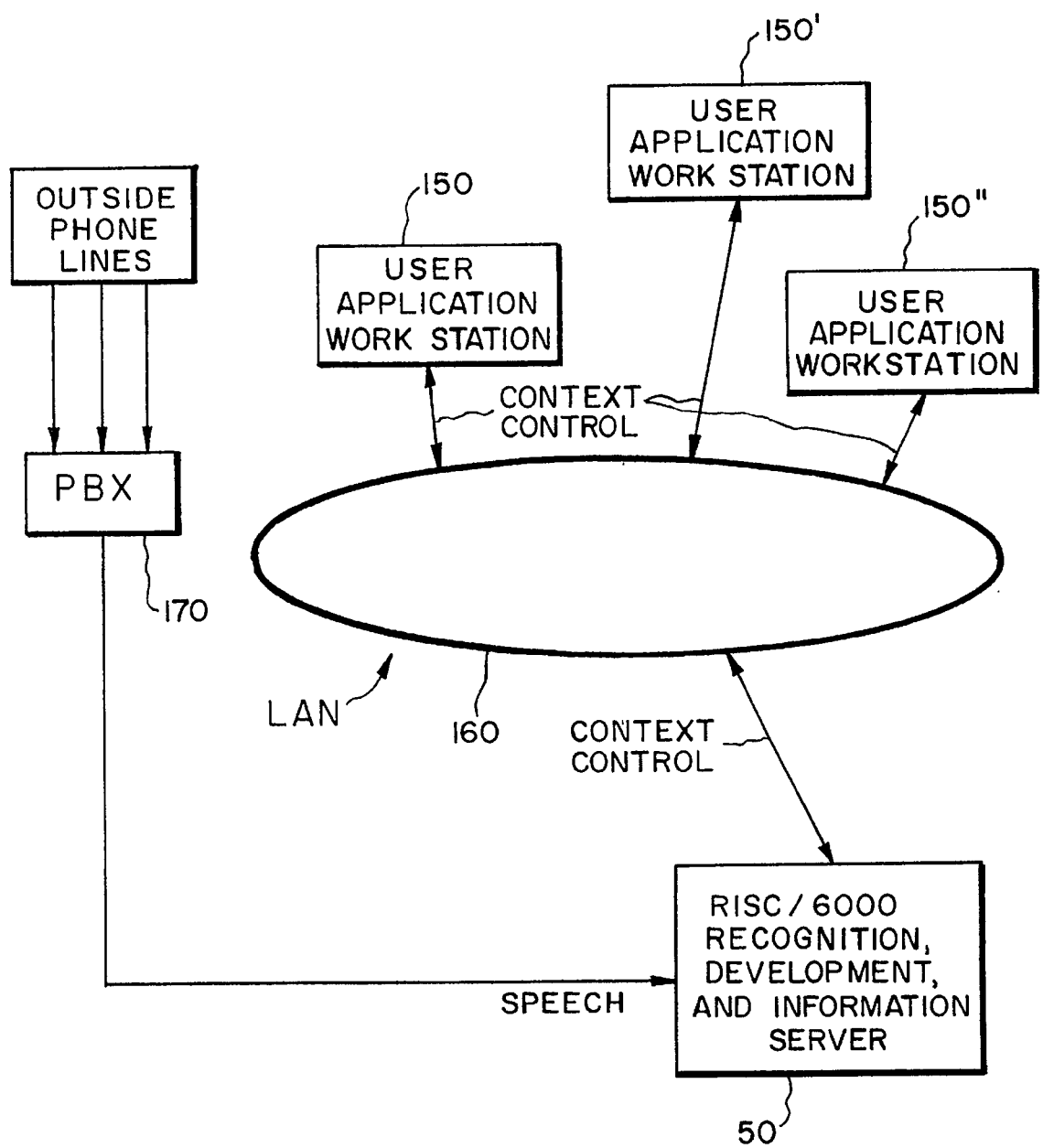
FIG. 2 is a block diagram of a network for recognition server operating in a telephony customer service call center.

The speech recognition system described herein, is architected to allow multiple deployments, on multiple hardware platforms, and multiple software configurations. For example, one possible architecture is shown in FIG. 2, which provides a physical mapping of the logical architecture 50, discussed above, onto a physical implementation of workstations 150, 150', 150" connected via a local area network 160. Each workstation in this architecture can run multiple independent user applications, and each is master to the recognition server 50 as a slave processor. The PBX 170 is connected to outside telephone lines and delivers a telephony bandwidth data stream to the analog/digital conversion 100 of the recognition server 50, shown in FIG. 1. The text representing recognized speech is returned from the recognition server to the user applications.

Instantaneous Context Switching for Speech Recognition Systems

A speech recognition system that is based on the use of discrete Hidden Markov Models (HMM's), such as the Sphinx system of Carnegie Mellon University [1], requires a large amount of memory dedicated to the storage of the HMM's. With this type of system that also expands the use of HMM's to generalized triphones as well as function words, there can result in more than 1000 HMM's that need be accessible for construction and use in particular tasks. With a multiplicity of code books and the phoneme modeling complexity as used in Sphinx, it is not unusual for each HMM to require close to 10,000 bytes of storage.

A practical implementation of HMM-based speech recognition will often consider system operational parameters such as speaker dependence/independence, isolated word/continuous speech, vocabulary size, and the need for language modeling when architecting and building an operational system.

Performance and functional demands on an actual operational system will usually put stringent demands on the computer system(s) used for implementation, including response time requirements that mandate the HMM's to be available in fast system memory for speedy access. For complex tasks that might require 1000 HMM's, real-memory storage requirements of 10 Mbytes (1000×10,000) for just the HMM's in a single task are the result since the recognition decision-making process is so closely coupled to the statistical information contained in the HMM's.

A given application with speech recognition for the user interface will in turn often involve many tasks to comprise its complete environment. This puts a system requirement to have fast switching from one task (or "context") to another. And if further a single computer system will be providing speech recognition services (like a server) to multiple clients (or users) then the demands for having a fast context (or task) switching become even more critical. Moving task models that have closely coupled with them large amounts of HMM's into and out of fast storage puts stringent performance demands on practical systems. Or pre-loading all possible tasks into memory would greatly increase the overall real memory requirements for the computer system.

The functional block diagram of FIG. 3 depicts the instantaneous context switching recognition system, in accordance with the invention. The system 50 includes a memory 200 connected by means of the bus 202 to the CPU 204. Also connected to the bus 202, is a speech input adapter 100 which connects the PBX 170 to the instantaneous context switching speech recognition system 50. Also connected to the bus 202, is a keyboard selector and a display 208. In addition, a communications adapter 210 is connected to the bus 202 and is also connected to the LAN 160. Still further, other output adapters 212 can also be connected to the bus 202.

In the invention disclosed herein, the above problem is solved by loading all possible HMM's into memory 200 in one block (one time) (see 220 in FIG. 3), as opposed to building individual recognition modules associated with each task that each carries the HMM information required for that task (with associated duplication of HMM's). In the speech recognition system disclosed herein, each task is guided by a simple language model, so the recognition module for each task includes network information for the legal syntax of phoneme transitions but not the memory associated with its required HMM's. For access to the statistical HMM information an additional level of indirection is built in with memory pointers 230 as described below. The HMM's are put into memory only once (220) in a single file, and each context or task (240) shares from the common pool.

At task building time, offsets (or mapping vectors 230) are calculated and stored along with the task recognition load module for each required HMM that identifies the relative location of the HMM in the file that contains the total group of all HMMs 220 that have been trained and are available for use by individual tasks (approximately a 10 Mbyte file using the sample numbers given) rather than actually storing the HMM's themselves. During actual system operation, applications arrange for the pre-storing of all tasks (240) and maps (230) they might require. Then when a particular application requires and gets the focus of the recognition engine for recognition with a particular task, the requested task search network is engaged by a simple assignment of one of several base pointers. The offsets 230 provided within the network in turn provide access to the actual HMM's.

Compared to the time that would be needed to load large search networks into memory upon demand, the context switching taught by this invention can be considered to be near-instantaneous. And if a speech recognition system were to pre-load into real memory a suitably large number of context or tasks (240) for which recognition is to be required, this invention provides for a large savings in the amount of real memory required.

The memory 200 in FIG. 3 is connected to the CPU 204, and program instructions stored in the memory 200 will be executed in the CPU 204.

A first partition in the memory 200 includes the context 1, also known as task 1, which includes a first plurality of words, W1, W2, etc. Each of the words in context 1 has a second plurality of phonemes. The phonemes are organized as triphones in the memory 200 of FIG. 3. For example, in context 1, W1 has the phonemes T0, T1 and T2. They may also be characterized as triphones.

A second context partition is included in the memory 200 of FIG. 3, this being context 2. Context 2 includes a third plurality of words, W1, W2, etc., which are generally different from the plurality of words in context 1 of FIG. 3. The third plurality of words in context 2 includes a fourth plurality of phonemes. The phonemes can also be represented as triphones. For example, in context 2, W2 has three phonemes, T6, T4 and T2.

A statistical pattern matching partition 220 is also included in the memory 200 and it includes a fifth plurality of phoneme pattern matching data units, D0–D9.

In accordance with the invention, a first pointer map is included in the memory 200 of FIG. 3. The first pointer map includes a second plurality of pointers, each of which relates a respective one of the second plurality of phonemes in context 1 to a respective one of the fifth pattern matching data units. For example, in context 1, the word W1, includes the phoneme T0 and the first pointer map in map 230 relates T0 to the statistical pattern match data D0.

Further, in accordance with the invention, the map 230 also includes a second pointer map which includes a fourth plurality of pointers, each of which relates a respective one of the fourth plurality of phonemes in context 2 to a respective one of the fifth plurality of pattern matching data units 220. For example, the context 2 word W2 has the phoneme T2 which is related by the second pointer map in map 230, to the statistical pattern match data D2.

Also shown in FIG. 3, is the keyboard selector 206 which is connected through the bus 202 to the memory 200. The keyboard selector 206 selects either the first context partition, context 1, and the first pointer map or alternately it selects the second context partition, context 2, and the second pointer map. This selection is performed to convert speech input information received from the speech input adapter 100 into character string information which is then output to either the display 208, the communications adapter 210, or the other output adapters 212.

In this manner, the context of a speech recognition application can be changed from context 1 to context 2 without loading new pattern matching data units 220 into the memory 200.

Training Process

The training procedure uses a large library of known utterances and their textual transcripts, to estimate the parameters of the phonemes HMMs used in pattern matching of word models to text in the beam search process.

First, the transcripts are used to retrieve the phonemes, representing the pronunciation of the words in the training set, from the General English dictionary.

Next the parameters of phoneme HMMs are estimated in the context of preceding, and following phonemes (called triphones), to provide for effective estimation of co-articulation effects. The estimation procedure used is the Baum-Welch Forward/backward iteration algorithm described in [8]. The parameters of the HMMs are iteratively adjusted so as to maximize the probability that the trained triphone HMMs would have generated the time series of VQ values observed in the training set.

There are many parameters for every hidden Markov phoneme model, there being 7 states and 12 transition arcs in each hidden state machine. Associated with each transition arc are associated 256 discrete elements in the probability distribution for each of the three code books. The triphone HMMs parameters that result from the training procedure are clustered sharply to reduce the number of triphones required to adequately represent the co-articulation effects present in continuous speech.

Figure 4B:
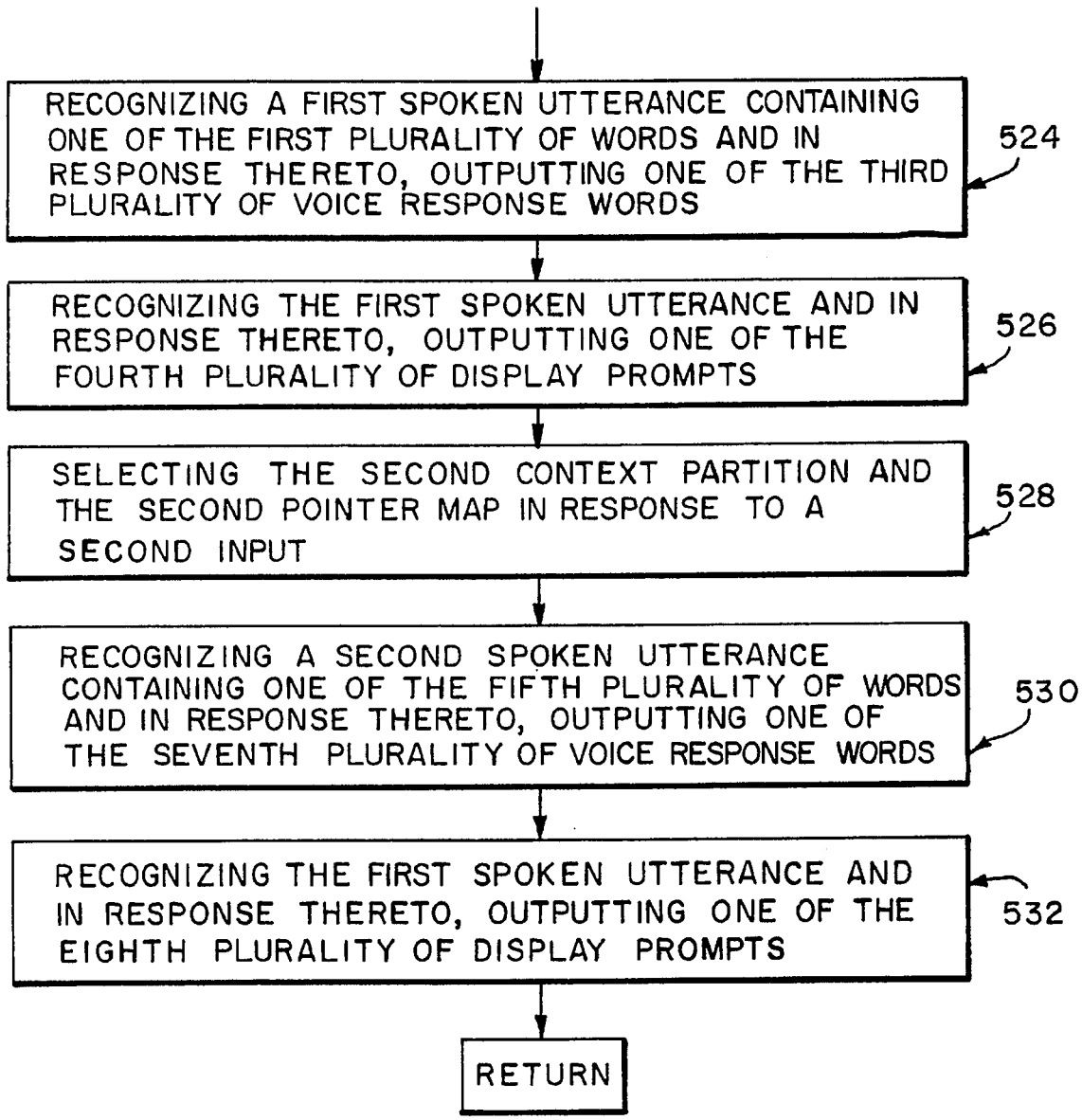

The method 500 of the invention is shown in the flow diagrams of FIGS. 4A and 4B. It can be embodied as a sequence of executable instructions in the memory 200 of FIG. 3, to be executed by the CPU 204. The steps are as follows.

Step 502: BEGIN METHOD TO PLAYBACK CONTEXT RELATED VOICE RESPONSE SIGNALS AND DISPLAY CONTEXT RELATED DISPLAY PROMPTS.

Step 504: STORING IN A FIRST PARTITION OF A MEMORY, A FIRST PLURALITY OF WORDS HAVING A FIRST CONTEXT, EACH OF THE FIRST PLURALITY OF WORDS INCLUDING A SECOND PLURALITY OF PHONEMES.

Step 506: STORING IN THE FIRST PARTITION A THIRD PLURALITY OF VOICE RESPONSE WORDS HAVING THE FIRST CONTEXT.

Step 508: STORING IN THE FIRST PARTITION A FOURTH PLURALITY OF DISPLAY PROMPTS HAVING THE FIRST CONTEXT.

Step 510: STORING IN A SECOND PARTITION OF THE MEMORY, A FIFTH PLURALITY OF WORDS HAVING A SECOND CONTEXT, EACH OF THE FIFTH PLURALITY OF WORDS INCLUDING A SIXTH PLURALITY OF PHONEMES.

Step 512: STORING IN THE SECOND PARTITION A SEVENTH PLURALITY OF VOICE RESPONSE WORDS HAVING THE SECOND CONTEXT.

Step 514: STORING IN THE SECOND PARTITION AN EIGHTH PLURALITY OF DISPLAY PROMPTS HAVING THE FIRST CONTEXT.

Step 516: STORING IN A THIRD PARTITION OF THE MEMORY, A NINTH PLURALITY OF PHONEME PATTERN MATCHING DATA UNITS.

Step 518: STORING A FIRST POINTER MAP IN THE MEMORY INCLUDING A SECOND PLURALITY OF POINTERS, EACH OF WHICH RELATES TO A RESPECTIVE ONE OF THE SECOND PLURALITY OF PHONEMES TO A RESPECTIVE ONE OF THE NINTH PLURALITY OF PATTERN MATCHING DATA UNITS.

Step 520: STORING A SECOND POINTER MAP IN THE MEMORY INCLUDING A SECOND PLURALITY OF POINTERS, EACH OF WHICH RELATES TO A RESPECTIVE ONE OF THE SIXTH PLURALITY OF PHONEMES TO A RESPECTIVE ONE OF THE NINTH PLURALITY OF PATTERN MATCHING DATA UNITS.

Step 522: SELECTING THE FIRST CONTEXT PARTITION AND THE FIRST POINTER MAP IN RESPONSE TO A FIRST INPUT.

Step 524: RECOGNIZING A FIRST SPOKEN UTTERANCE CONTAINING ONE OF THE FIRST PLURALITY OF WORDS AND IN RESPONSE THERETO, OUTPUTTING ONE OF THE THIRD PLURALITY OF VOICE RESPONSE WORDS.

Step 526: RECOGNIZING THE FIRST SPOKEN UTTERANCE AND IN RESPONSE THERETO, OUTPUTTING ONE OF THE FOURTH PLURALITY OF DISPLAY PROMPTS.

Step 528: SELECTING THE SECOND CONTEXT PARTITION AND THE SECOND POINTER MAP IN RESPONSE TO A SECOND INPUT.

Step 530: RECOGNIZING A SECOND SPOKEN UTTERANCE CONTAINING ONE OF THE FIFTH PLURALITY OF WORDS AND IN RESPONSE THERETO, OUTPUTTING ONE OF THE SEVENTH PLURALITY OF VOICE RESPONSE WORDS.

Step 532: RECOGNIZING THE FIRST SPOKEN UTTERANCE AND IN RESPONSE THERETO, OUTPUTTING ONE OF THE EIGHTH PLURALITY OF DISPLAY PROMPTS.

The method 500 then returns to the main program.

While the invention has been described with reference to a preferred embodiment, it will be understood by those skilled in the art that various changes can be made to the architecture without departing from the spirit and scope of the invention. Accordingly, the invention shall be limited only as specified in the following claims.

REFERENCES DESCRIBING RELATED WORK AND MATERIALS

[1] Kai-Fu Lee, "Large Vocabulary Speaker and Dependent Continuous Speech Recognition: The Sphinx System;" Carnegie Mellon University, Department of Electrical and Computer Engineering, April 1988; CMU-CS-88-148.

[2] R. E. Crochiere, "A General Program to Perform Sampling Rate Conversion of Data by Rational Ratios;" from "Programs for Digital Signal Processing," Ed.: Digital Signal Processing Committee of the IEEE Acoustics, Speech, and Signal Processing Society; IEEE Press, 1979; Section 8.2, pp 8.2-1 to 8.2-7.

[3] L. R. Rabiner, B. Gold, "Theory and Application of Digital Signal Processing," Prentice Hall, 1975, p. 91.

[4] "Digital Processing of Speech Signals," Prentice Hall Signal Processing Series; 1978, pp 401–402, 411–413.

[5] Y. Linde, A. Buzo, R. Gray, "An Algorithm for Vector Quantizer Design," *IEEE Transactions on Communications*, Vol. com-28, No. 1, January 1980.

[6] B. Booth, "IBM Continuous Speech Recognition System Programmers Guide," 1992, currently unpublished, available on request.

[7] "AIX Distributed Environments: NFS, NCS, RPC, DS Migration, LAN Maintenance and Everything," IBM International Technical Support Centers, Publication GG24-3489, May 8, 1990.

[8] L. Rabiner, "A Tutorial on Hidden Markov Models and Selected Applications in Speech Recognition," *Readings in Speech Recognition*, Ed.: A. Waibel, K. Lee; Morgan Kaufmann; 1990; pp. 267–296.

[9] "IBM CallPath DirectTalk/2 General Information and Planning Manual," International Business Machine publication No. GB35-4403-0; 1991.

[10] L. R. Bahl, F. Jelinek, R. Merce, "A Maximum Likelihood Approach to Continuous Speech Recognition," *Readings in Speech Recognition*; Ed.: A. Waibel, K. Lee; Morgan Kaufmann; 1990; pp. 308–319.

[11] F. Jelinek, R. L. Mercer, L. R. Bahl and J. K. Baker, "Perplexity—A Measure of Difficulty of Speech Recognition Tasks," paper delivered at the 94th meeting of the Acoustical Society of America, Miami Beach, Dec. 15, 1977. Summary in *Journal of the Acoustical Society of America*, Vol. 62, Suppl. No. 1, p. S63, Fall 1977.

[12] F. Jelinek, R. L. Mercer and L. R. Bahl, "Continuous Speech Recognition: Statistical Methods," pp. 549–573 in *Handbook of Statistics, Volume 2: Classification, Pattern Recognition and Reduction of Dimensionality*, P. R. Krishnaiah and L. N. Kanal, Eds., North-Holland Publishing Company, 1982.

[13] IBM Continuous Speech Series Technical Reference Guide.

What is claimed is:

1. In a data processing system, a method to playback context related voice response signals and display prompts, comprising the steps of:

storing in a first partition of a memory, a first plurality of words having a first context, each of said first plurality of words including a second plurality of phonemes;

storing in said first partition a third plurality of voice response words having said first context;

storing in a second partition of said memory, a fifth plurality of words having a second context, each of said fifth plurality of words including a sixth plurality of phonemes;

storing in said second partition a seventh plurality of voice response words having said second context;

storing in a third partition of said memory, a ninth plurality of phoneme pattern matching data units for sharing by both contexts;

storing a first pointer map in said memory including a first plurality of pointers, each of which points to a respective one of said second plurality of phonemes and to a respective one of said ninth plurality of pattern matching data units;

storing a second pointer map in said memory including a second plurality of pointers, each of which points to a respective one of said sixth plurality of phonemes and to a respective one of said ninth plurality of pattern matching data units;

selecting said first context and said first pointer map in response to a first input;

recognizing a first spoken utterance containing one of said first plurality of words and in response thereto, outputting one of said third plurality of voice response words;

recognizing said first spoken utterance and in response thereto, outputting one of said fourth plurality of display prompts;

instantaneously selecting said second context and said second pointer map in response to a second input without loading new pattern matching data units in said memory;

recognizing a second spoken utterance containing one of said fifth plurality of words and in response thereto, outputting one of said seventh plurality of voice response words; and recognizing said second spoken utterance and in response thereto, outputting one of said eighth plurality of display prompts.

2. The method of claim 1, wherein said second input is a context switching voice utterance.

3. The method of claim 2, wherein said one of said third plurality of voice response words is a voice prompt to prompt a user to speak said context switching voice utterance.

4. The method of claim 1, wherein said first input is a second occurring voice utterance that is combined with a first occurring voice utterance in a dialogue history.

5. The method of claim 1, wherein said first input is a voice utterance that activates a speech-activated display button.

6. The method of claim 1, wherein said recognizing steps include concatenation of words into phrases.

7. The method of claim 1, wherein said recognizing steps include concatenation of words into sentences.

8. The method of claim 1, wherein said recognizing steps include recognition of speaker-independent, continuous speech.

9. The method of claim 2, wherein said one of said fourth plurality of display prompts direct a user to speak said context switching voice utterance.

10. In a data processing system, a method to playback context related voice response signals, comprising the steps of:

storing in a first partition of a memory, a first plurality of words having a first context, each of said first plurality of words including a second plurality of phonemes;

storing in said first partition a third plurality of voice response words having said first context;

storing in a second partition of said memory, a fifth plurality of words having a second context, each of said fifth plurality of words including a sixth plurality of phonemes;

storing in said second partition a seventh plurality of voice response words having said second context;

storing in a third partition of said memory, a ninth plurality of phoneme pattern matching data units for sharing by both contexts;

storing a first pointer map in said memory including a first plurality of pointers, each of which points to a respective one of said second plurality of phonemes and to a respective one of said ninth plurality of pattern matching data units;

selecting said first context and said first pointer map in response to a first input;

recognizing a first spoken utterance containing one of said first plurality of words using speaker-independent, continuous speech recognition, and in response thereto, outputting one of said third plurality of voice response words;

instantaneously selecting said second context and said second pointer map in response to a second input without loading new pattern matching data units in said memory; and recognizing a second spoken utterance containing one of said fifth plurality of words using speaker-independent, continuous speech recognition, and in response thereto, outputting one of said seventh plurality of voice response words.

11. The method of claim 10, wherein said second input is a context switching voice utterance.

12. The method of claim 11, wherein said one of said third plurality of voice response words is a voice prompt to prompt a user to speak said context switching voice utterance.

13. The method of claim 10, wherein said first input is a second occurring voice utterance that is combined with a first occurring voice utterance in a dialogue history.

14. The method of claim 10, wherein said first input is a voice utterance that activates a speech-activated display button.

15. The method of claim 10, wherein said recognizing steps include concatenation of words into phrases.

16. The method of claim 10, wherein said recognizing steps include concatenation of words into sentences.

17. In a data processing system, a method to playback context related voice response signals, comprising the steps of:

storing in a memory, a first plurality of words having a first context, each of said first plurality of words including a second plurality of phonemes;

storing in said memory a third plurality of voice response words having said first context;

storing in said memory, a fifth plurality of words having a second context, each of said fifth plurality of words including a sixth plurality of phonemes;

storing in said memory a seventh plurality of voice response words having said second context;

storing in said memory, a ninth plurality of phoneme pattern matching data units for sharing by both contexts;

storing a first pointer map in said memory including a first plurality of pointers, each of which points to a respective one of said second plurality of phonemes and to a respective one of said ninth plurality of pattern matching data units;

storing a second pointer map in said memory including a second plurality of pointers, each of which points to a respective one of said sixth plurality of phonemes and to a respective one of said ninth plurality of pattern matching data units;

selecting said first context and said first pointer map in response to a first input;

recognizing a first spoken utterance containing one of said first plurality of words using speaker-independent, continuous speech recognition, and in response thereto, outputting one of said third plurality of voice response words;

instantaneously selecting said second context and said second pointer map in response to a second input without loading new pattern matching data units in said memory; and recognizing a second spoken utterance containing one of said fifth plurality of words using speaker-independent, continuous speech recognition, and in response thereto, outputting one of said seventh plurality of voice response words.

18. The method of claim 17, wherein said second input is a context switching voice utterance.

19. The method of claim 18, wherein said one of said third plurality of voice response words is a voice prompt to prompt a user to speak said context switching voice utterance.

20. The method of claim 17, wherein said first input is a second occurring voice utterance that is combined with a first occurring voice utterance in a dialogue history.

21. The method of claim 17, wherein said first input is a voice utterance that activates a speech-activated display button.

22. The method of claim 17, wherein said recognizing steps include concatenation of words into phrases.

23. The method of claim 17, wherein said recognizing steps include concatenation of words into sentences.

24. A data processing system to playback context related voice response signals, comprising:

means for storing in a memory, a first plurality of words having a first context, each of said first plurality of words including a second plurality of phonemes;

means for storing in said memory a third plurality of voice response words having said first context;

means for storing in said memory, a fifth plurality of words having a second context, each of said fifth plurality of words including a sixth plurality of phonemes;

means for storing in said memory a seventh plurality of voice response words having said second context;

means for storing in said memory, a ninth plurality of phoneme pattern matching data units for sharing by both contexts;

means for storing a first pointer map in said memory including a first plurality of pointers, each of which points to a respective one of said second plurality of phonemes and to a respective one of said ninth plurality of pattern matching data units;

means for storing a second pointer map in said memory including a second plurality of pointers, each of which points to a respective one of said sixth plurality of phonemes to a respective one of said ninth plurality of pattern matching data units;

means for selecting said first context and first pointer map in response to a first input:

means for recognizing a first spoken utterance containing one of said first plurality of words using speaker-independent, continuous speech recognition, and in response thereto, outputting one of said third plurality of voice response words;

means for selecting said second pointer map in response to a second input without loading new pattern matching data units in said memory; and means for recognizing a second spoken utterance containing one of said fifth plurality of words using speaker-independent, continuous speech recognition, and in response thereto, outputting one of said seventh plurality of voice response words.

25. A data processing system to playback context related voice response signals and display prompts, comprising:

means for storing in a first partition of a memory, a first plurality of words having a first context, each of said first plurality of words including a second plurality of phonemes;

means for storing in said first partition a third plurality of voice response words having said first context;

means for storing in said first partition a fourth plurality of display prompts having said first context;

means for storing in a second partition of said memory, a fifth plurality of words having a second context, each of said fifth plurality of words including a sixth plurality of phonemes;

means for storing in said second partition a seventh plurality of voice response words having said second context;

means for storing in said second partition an eighth plurality of display prompts having said first context;

means for storing in a third partition of said memory, a ninth plurality of phoneme pattern matching data units for sharing by both contexts;

means for storing a first pointer map in said memory including a first plurality of pointers, each of which points to a respective one of said second plurality of phonemes and to a respective one of said ninth plurality of pattern matching data units;

means for selecting said first context and said first pointer map in response to a first input;

means for recognizing a first spoken utterance containing one of said first plurality of words and in response thereto, outputting ne of said third plurality of voice response words;

means for recognizing said first spoken utterance and in response thereto, outputting one of said fourth plurality of display prompts;

means for selecting said second context and said second pointer map in response to a second input without loading new pattern matching data units in said memory;

means for recognizing a second spoken utterance containing one of said fifth plurality of words and in response thereto, outputting one of said seventh plurality of voice response words; and means for recognizing said second spoken utterance and in response thereto, outputting one of said eight plurality of display prompts.

26. In a data processing system to playback context related voice response signals and display prompts, a speech recognition system comprising:

speech input means for generating a series of vector quantization values (VQ) indicative of speech input;

means for generating multiple word grammars as contexts, each context related to a user application;

a speech recognition unit for matching word sequences in a context to the series of VQ values in the speech input means coupling the speech input means, a processor, and an output device to a memory;

a plurality of the contexts stored in the memory, each context containing a plurality of words represented by phonemes;

a plurality of voice response words stored in the memory for each context;

a plurality of voice prompts stored in the memory for each plurality of voice response words related to a context;

a phoneme pattern matching unit stored in the memory for sharing by all contexts in the speech recognition unit;

a plurality of pointer maps stored in the memory, each pointer map coupled to a different context, each pointer in a map connecting a phoneme in a word to a phoneme in the pattern matching unit;

stored program instructions in the memory for operating the processor to match the VQ values in the speech input to the words stored in the context and generating character strings representative of the speech input as an output in the output device;

means for instantaneously switching the speech recognition unit from one context to another context without changing the phoneme pattern matching units;

means for recognizing a first spoken utterance containing one of a plurality of words related to a first context and in response thereto, outputting one of said voice response words related to said first context;

means for recognizing said first spoken utterance and in response thereto, outputting one of said display prompts related to said outputted voice response word;

means for selecting said second context and said second pointer map in response to a second input;

means for recognizing a second spoken utterance containing one of a plurality of words related to a second context and in response thereto, outputting one of a plurality of voice response words included in said second context; and means for recognizing said second spoken utterance and in response thereto, outputting one of said display prompts related to said voice response word related to the second context.

27. The system of claim 26 further comprising a communications adapter for coupling the system to multiple stations in a network, each station including the speech recognition unit.

28. The system of claim 27 wherein the phonemes are Hidden Markov Models.

29. The system of claim 28 further including a recognition server to enable a user to request the services of a speech recognition unit for an application running on the processor or running on a different processor on the network.

30. The system of claim 29 including means for continuous speech independent recognition.

31. The system of claim 30 including means to reduce the storage capacity of the memory.

32. In a data processing system to playback context related voice response signals and display prompts, a continuous speech recognition system for recognizing input speech in different contexts, comprising a front end for receiving the speech related to the contexts, a speech recognition unit including a processor and a memory for generating character strings representative of the speech input, a method of speech recognition comprising the steps of:

storing in the memory a plurality of contexts of words, each word represented by at least one phoneme;

storing in the memory a plurality of voice prompts for each plurality of voice response words related to a context;

storing in the memory a plurality of voice prompts for each plurality of voice response words related to a context;

storing in the memory a plurality of phoneme pattern matching units for sharing by all contexts;

storing in the memory pointer maps, each pointer map connecting phonemes in the words to phonemes in the phoneme pattern matching units;

storing in the memory program instructions for operating the processor;

operating the processor using the stored program instruction to match the speech input to the words in the context using the shared phoneme pattern matching units;

generating character strings as an output from the system from the matched speech input and words in the context;

instantaneously switching the system to another context stored in the memory without changing the phoneme pattern matching units.

recognizing a first spoken utterance containing one of a plurality of words related to a first context and in response thereto, outputting one of said voice response words related to said first context;

recognizing said first spoken utterance and in response thereto, outputting one of said display prompts related to said outputted voice response word;

recognizing a second spoken utterance containing one of a plurality of words related to a second context and in response thereto, outputting one of a plurality of voice response words related to said second context; and recognizing said second spoken utterance and in response thereto, outputting one of said display prompts related to said voice response word related to the said second context.

33. The method of claim 31 wherein each phoneme is represented by a triphone.

34. The method of claim 32 further comprising the step of:

generating a series of vector quantization values representative of the speech input.

35. The method of claim 34 further comprising the step of:

operating a selection device to instantaneously switch the system from one context to another.

36. The method of claim 35 further comprising the step of;

storing at least one user application in a recognition server for a plurality of speech recognition units in a network to enable the applications to be recognized concurrently in the network.

37. The method of claim 36 wherein the speech recognition unit is speaker independent.

38. The method of claim 36 wherein the different contexts form a vocabulary of words in which certain words are anticipated by the speech recognition unit.

39. The method of claim 32 wherein said the second spoken utterance is combined with the first spoken utterance in a dialogue history.

40. The system of claim 26 further including means for combining spoken utterances related to a context in a dialogue history.

* * * * *